(12) United States Patent
Chen et al.

(10) Patent No.: US 12,512,021 B2
(45) Date of Patent: Dec. 30, 2025

(54) SPLICING INSTALLATION ASSEMBLY OF DISPLAY DEVICE AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Yao Chen, Guangdong (CN); Min Wang, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 305 days.

(21) Appl. No.: 17/597,952

(22) PCT Filed: Jan. 13, 2022

(86) PCT No.: PCT/CN2022/071734
§ 371 (c)(1),
(2) Date: Jan. 30, 2022

(87) PCT Pub. No.: WO2023/123565
PCT Pub. Date: Jul. 6, 2023

(65) Prior Publication Data
US 2024/0038102 A1      Feb. 1, 2024

(30) Foreign Application Priority Data
Dec. 27, 2021   (CN) .......................... 202111618974.2

(51) Int. Cl.
*G09F 9/302*          (2006.01)

(52) U.S. Cl.
CPC .................................. *G09F 9/3026* (2013.01)

(58) Field of Classification Search
CPC ...................................................... G09F 9/3026
See application file for complete search history.

(56) References Cited

U.S. PATENT DOCUMENTS 6,292,239 B1 *   9/2001   Nagamura ........ G02F 1/133308
                                              349/61
2001/0021110 A1 *  9/2001   Nakayama .............. G09F 13/14
                                              362/297

(Continued)

FOREIGN PATENT DOCUMENTS

CN        2862240 Y      1/2007
CN      101211048 A  *   7/2008  ......... G02F 1/13336

(Continued)

OTHER PUBLICATIONS

International Search Report in International application No. PCT/CN2022/071734, mailed on Sep. 28, 2022.

(Continued)

*Primary Examiner* — Allen L Parker
*Assistant Examiner* — Keon Kim
(74) *Attorney, Agent, or Firm* — PV IP PC; Peter S. Stecher; Wei Te Chung

(57) ABSTRACT

The present application provides a splicing installation assembly of a display device, and a display device. The splicing installation assembly includes a backboard, a middle frame and a partition, the middle frame is configured to connect to the backboard of the display device; the partition is arranged in the middle frame and is connected to an inner wall of the middle frame, and is configured to partition an inner space of the middle frame to form a plurality of installation areas for installing backlight modules. As such, multiple backlight modules are possible to install on the same splicing installation assembly, thereby (Continued)

reducing a space occupied by the middle frame between adjacent ones of the backlight modules, thus reducing a splicing gap.

10 Claims, 2 Drawing Sheets

(56) References Cited

U.S. PATENT DOCUMENTS

| | | |
|---|---|---|
| 2008/0198296 A1 | 8/2008 | Chu et al. |
| 2013/0310170 A1* | 11/2013 | Joko ................. A63F 13/24 463/31 |
| 2016/0198578 A1* | 7/2016 | Du ....................... G09F 9/30 361/679.01 |
| 2016/0316578 A1* | 10/2016 | Cha ..................... G02B 5/08 |
| 2018/0190631 A1* | 7/2018 | Kim .................... H01L 25/162 |
| 2019/0166704 A1* | 5/2019 | Shin ................... H05K 5/0221 |
| 2019/0231166 A1* | 8/2019 | Anderson ............ A47L 23/26 |
| 2020/0400999 A1* | 12/2020 | Chang ............. G02F 1/133608 |
| 2022/0415217 A1* | 12/2022 | Zhang ................. H01L 33/005 |

FOREIGN PATENT DOCUMENTS

| | | | |
|---|---|---|---|
| CN | 102968930 A * | 3/2013 | ............ G09F 9/302 |
| CN | 103778866 A * | 5/2014 | ....... G02F 1/133308 |
| CN | 204143788 U | 2/2015 | |
| CN | 105193022 B * | 9/2016 | ............... A44C 5/00 |
| CN | 206920772 U | 1/2018 | |
| CN | 108563067 A | 9/2018 | |
| CN | 209133101 U | 7/2019 | |
| CN | 110456552 A | 11/2019 | |
| CN | 210722218 U * | 6/2020 | ............ G09F 9/302 |
| CN | 212084568 U | 12/2020 | |
| CN | 113296307 A | 8/2021 | |

OTHER PUBLICATIONS

Written Opinion of the International Search Authority in International application No. PCT/CN2022/071734, mailed on Sep. 28, 2022.

Chinese Office Action issued in corresponding Chinese Patent Application No. 202111618974.2 dated Aug. 1, 2022, pp. 1-6.

* cited by examiner

SPLICING INSTALLATION ASSEMBLY OF DISPLAY DEVICE AND DISPLAY DEVICE

BACKGROUND OF INVENTION

Field of Invention

The present application relates to the field of display technology, and in particular, to a splicing installation assembly of a display device and a display device.

Description of Prior Art

With development of science and technology, human beings have entered an era of digital information. In daily life, it is often seen that information is transmitted through display devices. With different application scenarios and uses of display devices, development of display devices also follows needs of the times are gradually diversifying. In the prior art, splicing display devices are often used. By splicing and installing different display devices to form a large display screen, multiple displays on one screen are realized.

However, in the prior art, the backlight modules are usually installed through a plurality of backboards and a plurality of middle frames, and then the installed backlight modules are spliced together, resulting in an excessively large splicing seam.

SUMMARY OF INVENTION

The present application provides a splicing installation assembly for a display device and a display device. By providing splicing installation assemblies with different installation areas for use in a middle frame, multiple backlight modules can be installed on the same middle frame, reducing a space occupied by the middle frame between adjacent backlight modules, thereby reducing the splicing gap.

On the one hand, the present application provides a splicing installation assembly of a display device, and the splicing installation assembly includes:
  a backboard;
  a middle frame installed on the backboard, wherein the middle frame and the backboard cooperatively define an accommodation space; and
  a partition disposed in the middle frame and connected to an inner wall of the middle frame, wherein the partition is configured to partition the accommodation space to form a plurality of installation areas for installing backlight modules.

By arranging partitions in the middle frame, the inner space of the middle frame is divided into a plurality of installation areas, which are used for installation of different backlight modules, so as to realize the installation of multiple backlight modules in the same middle frame, so that the respective middle frames of the backlight modules are thereby prevented from separately installing to occupy a large space during splicing, so as to reduce the splicing interval between adjacent display areas, thereby reducing the splicing gap.

In a possible implementation of the present application, the splicing installation assembly further includes: a first installation portion and a second installation portion;
  the first installation portion is arranged at the middle frame, and the second installation portion is arranged at the partition; and
  the first installation portion and the second installation portion are respectively disposed facing the installation areas, and are configured to install optical films of the backlight modules.

By arranging the first installation portion and the second installation portion, wherein the first installation portion and the second installation portion are arranged facing the installation areas respectively to provide an installation space for installation of the optical films of the optical modules, thereby realizing the installation of the optical films of the backlight modules.

In a possible implementation of the present application, the first installation portion is a first installation platform, and the first installation platform is arranged on the inner wall of the middle frame facing the partition;
  the second installation part is a second installation platform, and the second installation platform is disposed on a side wall of the partition facing the middle frame; and
  the first installation platform and the second installation platform are disposed on a same horizontal plane.

By setting the first installation portion and the second installation portion to be the first installation platform and the second installation platform, respectively, the installation of the optical films of the backlight modules is more convenient, and the first installation platform and the second installation platform are located on the same horizontal plane, which ensures levelness of the installation of the optical films, and ensures rationality and stability of the installation of the optical films.

In a possible implementation of the present application, a reflective layer is disposed on the side wall of the partition facing the middle frame.

By arranging the reflective layer, it is ensured that the optical modules in all the installation areas have better light-emitting effect, meanwhile, a mutual influence of light emission between the optical modules in different installation areas can be prevented, and a light loss can also be reduced.

In a possible implementation of the present application, the partition is cross-shaped, four ends of the partition are respectively connected to the inner wall of the middle frame, and the partition is configured to divide the middle frame to form four installation areas.

In a possible implementation of the present application, a position of the backboard corresponding to the partition is provided with a limit groove, a first limit structure is disposed in the limit groove, and a second limit structure is disposed at one end of the partition installed in the limit groove.

By setting the limit groove to realize a preliminary installation limit of the partition, horizontal displacement of the partition based on the backboard is restricted, thereby preventing the displacement of the partition from causing squeeze of the films of the backlight modules. Meanwhile, by adopting a cooperation of the first limit structure and the second limit structure, the partition can be further limited, wherein the partition is limited in a vertical direction of the backboard, so as to ensure installation stability of the partition.

In a possible implementation of the present application, a backboard installation groove is disposed on the inner wall of the middle frame facing the partition, and an edge of the backboard is disposed in the backboard installation groove.

By setting the backboard installation groove, the backboard and the middle frame are installed to ensure the stability of the installation.

In a possible implementation of the present application, the partition is provided with a functional groove for wiring and installing a control structure.

The functional groove is provided for installation of the wiring and accommodation of the control structure.

In a possible implementation of the present application, a side of the backboard facing the installation areas is correspondingly provided with a plurality of protruding structures.

Several protruding structures are provided to limit a distance between a light source installed on the backboard and the optical films of the backlight module, while supporting the optical films of the backlight modules to prevent the optical films of the backlight module from collapse.

In a possible implementation of the present application, the partition is detachably connected to the backboard through a locking structure.

In a possible implementation of the present application, each of the protruding structures is a conical protrusion.

On the other hand, the present application also provides a splicing installation assembly of a display device, and the splicing installation assembly includes:
 a backboard;
 a middle frame installed on the backboard, wherein the middle frame and the backboard cooperatively define an accommodation space;
 a partition disposed in the middle frame and connected to an inner wall of the middle frame, wherein the partition is configured to partition the accommodation space to form a plurality of installation areas for installing backlight modules; and
 a reflective layer disposed on a side wall of the partition facing the middle frame,
 wherein the partition is cross-shaped, four ends of the partition are respectively connected to the inner wall of the middle frame, and the partition is configured to divide the middle frame to form four installation areas.

In a possible implementation of the present application, the splicing installation assembly further includes: a first installation portion and a second installation portion;
 the first installation portion is arranged at the middle frame, and the second installation portion is arranged at the partition; and
 the first installation portion and the second installation portion are respectively disposed facing the installation areas, and are configured to install optical films of the backlight modules.

In a possible implementation of the present application, a position of the backboard corresponding to the partition is provided with a limit groove, a first limit structure is disposed in the limit groove, and a second limit structure is disposed at one end of the partition installed in the limit groove.

In a possible implementation of the present application, a backboard installation groove is disposed on the inner wall of the middle frame facing the partition, and an edge of the backboard is disposed in the backboard installation groove.

In a possible implementation of the present application, the partition is provided with a functional groove for wiring and installing a control structure.

On the other hand, the present application provides a display device including the splicing installation assembly in the display device, wherein the splicing installation assembly includes a backboard, a middle frame, and a partition; the middle frame is installed on the backboard, the middle frame and the backboard cooperatively define an accommodation space; and the partition is disposed in the middle frame and connected to an inner wall of the middle frame and is configured to partition the accommodation space to form a plurality of installation areas for installing backlight modules; wherein the display device further includes a number of the backlight modules corresponding to a number of the installation areas, and the plurality of the backlight modules are respectively installed in the plurality of installation areas in a one-to-one correspondence.

In a possible implementation of the present application, the display device further includes a number of display screens corresponding to the number of the installation areas, and the plurality of the display screens are installed in the installation areas in a one-to-one correspondence and are disposed above the backlight module.

In a possible implementation of the present application, the display screens are installed on a top of the middle frame and a top of the partition, the top of the middle frame is provided with a raised fence, the raised fence is disposed around the display screens, the partition is provided with a functional groove, and a wiring end of the display screens is disposed corresponding to the functional groove.

In a possible implementation of the present application, a top of the partition and a top of the middle frame are respectively configured for installing a limit adhesive layer on the display screens.

In the present application, a splicing installation assembly of a display device and a display device are provided. By arranging partitions in the middle frame, the inner space of the middle frame is divided into a plurality of installation areas, which are used for installation of different backlight modules, so as to realize the installation of multiple backlight modules in the same middle frame, so that the respective middle frames of the backlight modules are thereby prevented from separately installing to occupy a large space during splicing, so as to reduce the splicing interval between adjacent display areas, thereby reducing the splicing gap.

BRIEF DESCRIPTION OF DRAWINGS

In order to more clearly illustrate the technical solutions of the embodiments of the present application, the drawings illustrating the embodiments will be briefly described below. Obviously, the drawings in the following description merely illustrate some embodiments of the present invention. Other drawings may also be obtained by those skilled in the art according to these figures without paying creative work.

Figure 1:
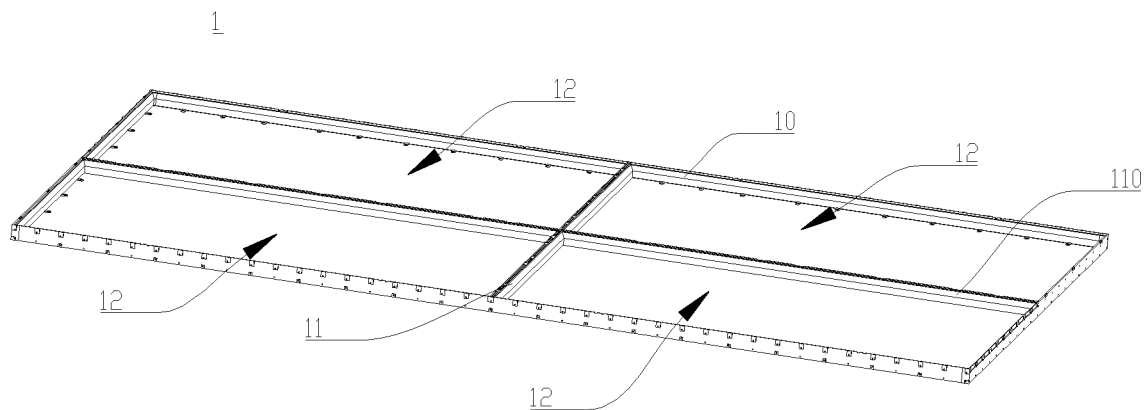
FIG. 1 is a schematic structural diagram of a splicing installation assembly of a display device provided by an embodiment of the present application.

Elements in the drawings are designated by reference numerals listed below.
 1, splicing installation assembly; 10, middle frame; 11, partition; 110, partition strip; 111, functional groove; 12, installation area; 3, backboard; 30, limit groove; 4, display screen.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of the present application, it should be understood that the terms "center", "longitudinal", "transverse", "length", "width", "thickness", "upper", "lower", "front", "Rear", "left", "right", "vertical", "horizontal", "top", "bottom", "inner space", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

The present application provides a display device and a method of manufacturing the display device. Each of them will be described in detail below. It should be noted that the description order of the following embodiments is not intended to limit the preferred order of the embodiments.

Embodiments of the present application are objected to solve a technical problem in the prior art that the backlight modules are usually installed through a plurality of backboards and a plurality of middle frames, and then the installed backlight modules are spliced together, so that a splicing position needs to accommodate two middle frames, resulting in an excessively large splicing seam.

Figure 2:
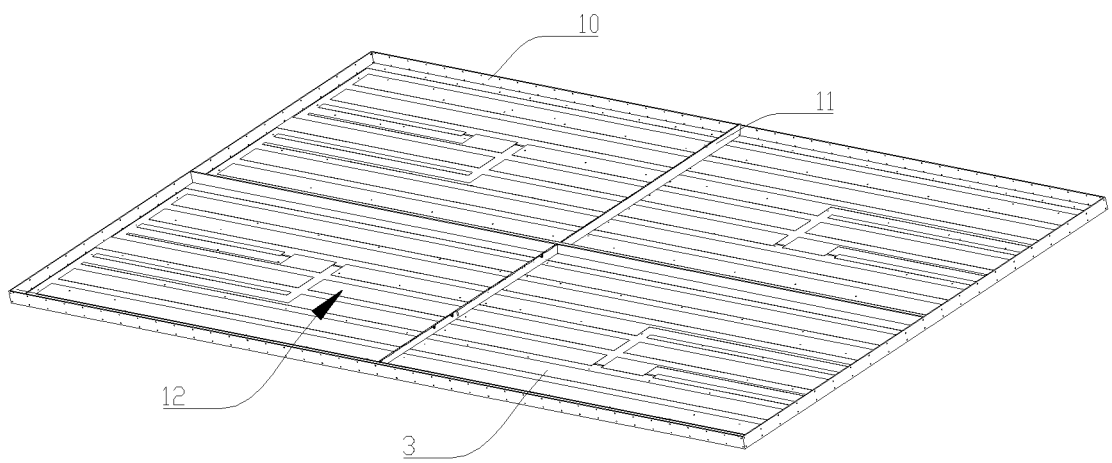
FIG. 2 is a schematic structural diagram of an embodiment of a splicing installation assembly of a display device provided in an embodiment of the present application.

Referring to FIGS. 1 and 2, an embodiment of the present application provides a splicing installation assembly 1 of a display device. The splicing installation assembly 1 includes: a backboard 3; a middle frame 10, and a partition 11, wherein the partition 10 is configured to connect to the backboard 3 of the display device, the middle frame 10 is installed on the backboard 3, wherein the middle frame 10 and the backboard 30 cooperatively define an accommodation space; the partition 11 is disposed in the middle frame 10 and is connected to an inner wall of the middle frame 10, wherein the partition 11 is configured to partition the accommodation space to form a plurality of installation areas 12 for installing backlight modules.

An embodiment of the present application provides a splicing installation assembly 1 of a display device, and the partition 11 is disposed in the middle frame 10 to partition an inner space of the middle frame 1 into a plurality of installation areas 12, which are used for installation of different backlight modules, to realize the installation of multiple backlight modules in the same middle frame 10, so that the respective middle frames of the backlight modules are thereby prevented from separately installing to occupy a large space during splicing, so as to reduce the splicing interval between adjacent display areas, thereby reducing the splicing gap, while reducing a material used for the middle frames, thus reducing the production cost.

It is appreciated that the middle frame 10 is an enclosing structure with openings at opposite ends, that is, the middle frame 10 can have a ring shape, a mouth shape, etc.; the space enclosed by the middle frame 10 is the inner space of the middle frame, that is an inner wall of the middle frame 10 is a side wall of the middle frame 10 facing the enclosed space; the partition 11 is arranged in the middle frame 10, connected to the inner wall of the middle frame 10, and configured to partition the inner space of the middle frame 10 to form a plurality of installation areas 12 for installing backlight modules, that is, the middle frame 10 is enclosed by the partition to form at least installation areas 12 for installation of different backlight modules, wherein a number of the installation areas 12 can be designed according to different installation requirements and application requirements, and can be 2, 3, 4, 5, etc. with the same area or different areas, which are not specifically limited in the present application.

It is appreciated that the function of the partition 11 is to divide the inner space of the middle frame 10 into a plurality of installation areas 12 for installing the backlight module, that is, to partition accommodation space defined by the middle frame 10 on the backboard 3 into a plurality of installation areas 12 for installing the backlight modules, and in order to ensure that the splicing gap between adjacent backlight modules is reduced while realizing the backlight modules. A width of the partition 11 is less than twice the width of the middle frame 10, that is, the width corresponds to the width of a gap between the adjacent backlight modules. It is appreciated that by setting the width of the partition 11 to be less than twice the width of the middle frame 10, which can reduce the gap between the backlight modules.

It is appreciated that the middle frame 10 and the partition 11 have an installation structure for installation the backlight modules corresponding to the installation areas 12. For example, the splicing installation assembly 1 further includes a first installation portion and a second installation portion; the first installation portion is arranged at the middle frame 10, the second installation portion is arranged at the partition 11; the first installation portion and the second installation portion are disposed facing the installation areas 12 for installing the backlight modules. Specifically, the first installation portion and the second installation portion may be installation grooves, installation bosses and the like with same structures.

It is appreciated that the partition 11 and the middle frame 10 can be fixedly connected or detachably connected, and the middle frame can also be realized by installing the partition 11 and the middle frame 10 on the backboard 3 respectively. Assembly of the middle frame 10 and the partition 11 can be specifically designed according to actual needs.

In the embodiment of the present application, the first installation portion is a first installation platform, and the first installation platform is arranged on the inner wall of the middle frame 10 facing the partition 11; the second installation portion is a second installation platform, and the second installation platform is arranged on the side wall of the partition 11 facing the middle frame 10; and the first installation platform and the second installation platform are located on the same horizontal plane. It is appreciated that, the first installation platform and the second installation platform can be provided with multiple installation positions corresponding to the films of the backlight modules, so that the films of the backlight modules can be arranged on the first installation platform and the second installation platform, and the first installation platform and the second installation platform corresponding to the same film are located on the same horizontal plane, that is, the films of the backlight modules can be installed through the adhesive layer. The first installation platform and the second installation platform can be arranged opposite to each other, arranged at intervals, or connected end to end correspondingly around the installation area 12 to arrange in a ring, which is not specifically limited in the present application, as long as the backlight modules can be installed.

In the embodiment of the present application, a reflective layer is provided on the side wall of the partition 11 facing the middle frame 10; the reflective layer is configured to isolate and reflect the light emission of the backlight modules, thereby enhancing the For the light-emitting effect, it is appreciated that the side of the middle frame 10 facing the installation area 12 can also be provided with a reflective coating to enhance the light-emitting effect of the backlight module. There is no specific limitation in the present application.

In some embodiments of the present application, the partition 11 may include a plurality of partition strips 110, that is, a plurality of installation areas 12 are formed by splicing and combining the plurality of partition strips 110 with the middle frame 10. Each of the partition strips 110 is a common installation edge of adjacent ones of the installation areas 12, that is, opposite sides of the partition strip 110 are respectively different installation areas 12, and the opposite sides of the partition strip 110 correspondingly facing the installation area 12 are respectively provided with second installation portions to realize the installation of the films of the backlight modules. In the embodiment of the present application, the partition 11 is cross-shaped and is composed of three partition strips 110, wherein a gap is provided at one end of the partition strips 110 that are connected to one another to provide an expansion space, and meanwhile, by setting the partition 11 composed of partition strips 110, which prevents the technical difficulty of integral arrangement and reduces an influence of a linkage between installation areas due to the installation strips. The four ends of the partition 11 are respectively connected to the inner wall of the middle frame 10, and are configured to partition the middle frame 10 into four installation areas 12. Specifically, in this embodiment, a shape of the installation area 12 is a square.

It is appreciated that the partition 11 is provided with a functional groove 111 for routing wires and installing a control structure. In the embodiment of the present application, the opening of the functional groove 111 is provided on the side facing away from the backboard, the functional groove 111 is configured to provide control structures such as a control chip, a control panel, and a chip-on-film of the display screen 4 that are accommodated and installed in the installation area 12, and to provide an opening for wiring.

Figure 3:
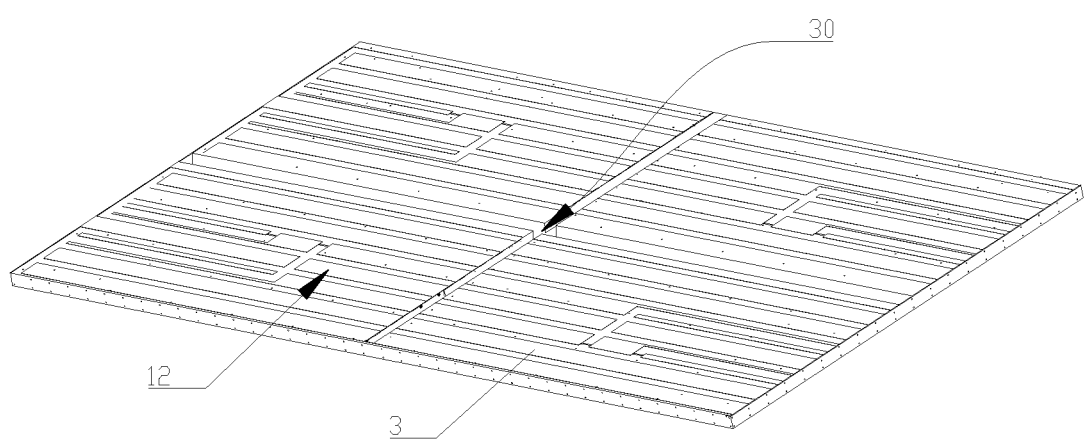
FIG. 3 is a schematic structural diagram of an embodiment of a backboard in a splicing installation assembly of a display device provided in an embodiment of the present application.

On the basis of the above embodiment, referring to FIG. 3, a limit groove 30 is provided on the backboard 3 at a position corresponding to the partition 11, and a first limit structure is provided in the limit groove 30. One end of the partition 11 installed in the limit groove 30 is provided with a second limit structure.

It is appreciated that by setting the limit groove 30 to realize a preliminary installation limit of the partition 11, horizontal displacement of the partition 11 based on the backboard 3 is restricted, thereby preventing the displacement of the partition 11 from causing squeeze of the films of the backlight modules. Meanwhile, by adopting a cooperation of the first limit structure and the second limit structure, the partition 11 can be further limited, wherein the partition 11 is limited in a vertical direction of the backboard, so as to ensure installation stability of the partition 11.

It is appreciated that, the first limit structure and the second limit structure may be a bolt fastening structure that cooperates with each other, a buckle structure that cooperates with each other, etc., for realizing the position limit of the partition member 11 and the back plate 3 in the vertical direction, which is not specifically limited in the present application.

It is appreciated that, the implementations of the partition 11, the middle frame 10, and the installation area 12 are the same as the above-mentioned implementations, and details are not repeated herein for brevity.

It is appreciated that the backboard 3 can be provided with LED light strips corresponding to the installation area 12 as the light source of the backlight module, and the backboard 3 can also be provided with lights corresponding to the installation positions of the LED light strips. strip installation slots, etc.

It is appreciated that, since the partition 11 is connected to the partition 11, the backboard 3 can be connected to the middle frame 10 to realize the connection between the backboard 3 and the splicing installation assembly 1. The backboard 3 can also be possible to connect to the partition 11 to realize the connection between the backboard 3 and the splicing installation assembly 1, or the backboard 3 is connected to the middle frame 10 and the partition 11 respectively to realize the connection between the backboard 3 and the splicing installation assembly 1. The connection manner can be bolt connection, snap connection, etc. realized through a locking structure.

It is appreciated that, in order to ensure that the displays of different backlight modules do not affect each other, the end of the partition 11 facing the backboard 3 is connected to the backboard 3.

In this embodiment, the inner wall of the middle frame 10 facing the partition 11 is provided with a backboard 3 installation groove, and the edge of the backboard 3 is arranged in the installation groove of the backboard 3 to realize the installation of the middle frame 10 and the backboard 3, it is appreciated that the installation groove may also be provided with bolt holes corresponding to the backboard 3, so as to further stabilize the installation of the backboard 3.

In other embodiments of the present application, it is also possible to provide a slot on the backboard 3 at a position corresponding to the middle frame 10, a slot on the backboard 3 at a position corresponding to the partition 11, or slots corresponding to the positions of the middle frame 10 and the partition 11 etc., to realize the installation of the backboard 3, the middle frame 10, and the partition 11.

In the embodiment of the present application, the partition 11 is detachably connected to the backboard 3 through a locking structure.

In the embodiment of the present application, the side of the backboard 3 facing the installation area 12 is correspondingly provided with a plurality of protruding structures, wherein the protruding structures are configured to support the films of the backlight modules. In this embodiment, in order to prevent the influence of the protruding structures on the light emission of the backlight modules, the protruding structures are set as a conical convex, and a small end of the conical faces the films of the backlight modules. It is appreciated that the plurality of protruding structures are arranged to dodge the LED light strips arranged on the backboard 3.

It is appreciated that, the protruding structure may be configured as a light-transmitting structure, or a reflective layer may be provided on the surface of the conical structure to further enhance the light-emitting effect.

In the present application, a splicing installation assembly of a display device is provided. By arranging partitions 11 in the middle frame 10, the inner space of the middle frame 10 is divided into a plurality of installation areas 12, which are used for installation of different backlight modules, so as to realize the installation of multiple backlight modules in the same middle frame 10 and on the same backboard 3, so that the respective middle frames of the backlight modules are thereby prevented from separately installing to occupy a large space during splicing, so as to reduce the splicing interval between adjacent display areas, thereby reducing the splicing gap and saving the production cost.

On the basis of the above embodiments, the present application provides a display device, which includes the backboard structure of the display device according to any one of the above embodiments.

It is appreciated that the display device further includes a plurality of backlight modules, and the backlight modules are respectively installed in the installation area 12, so as to realize multiple displays on one screen, while reducing the splicing gap and reducing the production cost.

In the present application, a splicing installation assembly of a display device is provided. By arranging partitions 11 in the middle frame 10, the inner space of the middle frame 10 is divided into a plurality of installation areas 12, which are used for installation of different backlight modules, so as to realize the installation of multiple backlight modules in the same middle frame 10 and on the same backboard 3, so that the respective middle frames of the backlight modules are thereby prevented from separately installing to occupy a large space during splicing, so as to reduce the splicing interval between adjacent display areas, thereby reducing the splicing gap and saving the production cost.

Figure 4:
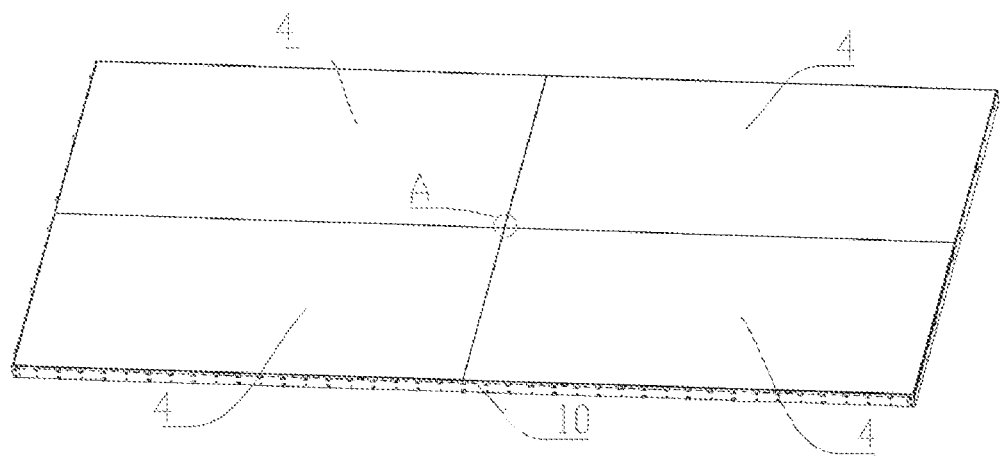
FIG. 4 is a schematic structural diagram of an embodiment of the display device provided in the embodiment of the present application.
Figure 5:
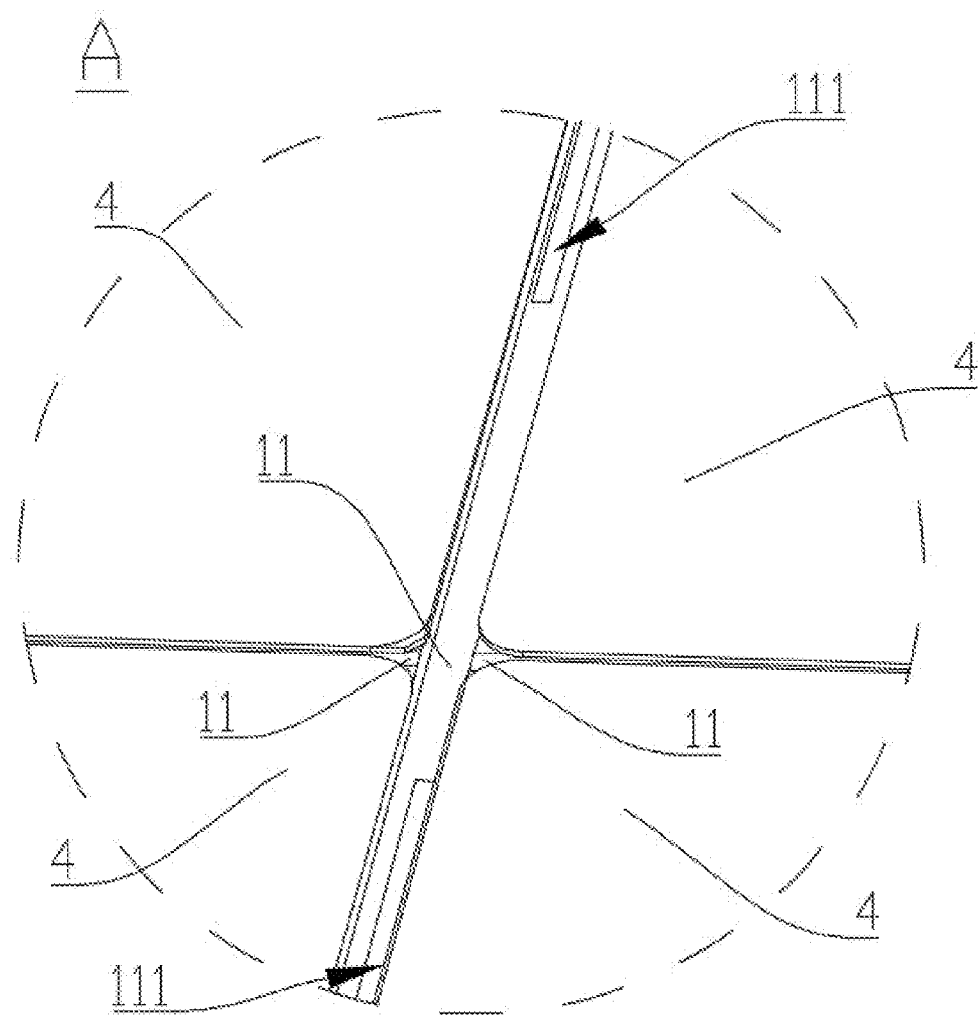
FIG. 5 is an enlarged schematic view of the structure of A in FIG. 4.

In the above embodiment of the present application, referring to FIG. 4 and FIG. 5, the display device further includes a number of display screens 4 corresponding to the number of the installation areas 12, and the plurality of the display screens 4 are installed in the installation areas 12 in a one-to-one correspondence and are disposed above the backlight module.

In the embodiment of the present application, the partition 11 and the middle frame 10 are provided with an installation structure corresponding to the display screen 4, which is configured to realize the installation with the display screen 4. It is appreciated that the installation structure for installing the display screen 4 may be an installation groove, an installation platform, etc., which are provided on the side wall of the middle frame 10 and the partition 11 facing the installation area 12; or the installation structure may also be the top of the partition 11 and the top of the middle frame 10, that is, the display screen 4 is installed on the top of the middle frame 10 and the top of the partition 11. It is appreciated that the edge of the display screen 4 is an invalid light-emitting area, that is, an area where no picture is displayed. The limit installation of the display screen 4 can be realized by arranging an adhesive layer on the top of the partition 11 and the top of the middle frame 10.

Further, in the embodiment of the present application, the display screen 4 is installed on the top of the middle frame 10 and the top of the partition 11, and a periphery of the top of the middle frame 10 is provided with a raised fence and a display screen. The top platform of 4 forms an L-shaped limit to realize the position limit and protection of the edge of the display screen 4, that is, the raised fence of the top of the middle frame 10 is arranged on one side of the edge of the display screen 4, and a height of the raised fence can be flush with a height of the display screen 4 or higher than or lower than the height of the display screen 4, which can be specifically designed according to the actual situation. In some embodiments of the present application, the partition 11 may also be provided with a common raised fence corresponding to the edge of the display screen 4 to further realize the position limit of the edge of the display screen 4, that is, the shared raised fence disposed on the partition 11 can be a shared raised strip arranged between adjacent display screens 4, or a raised segment arranged at intervals, and a thickness of the shared raised fence can be set according to actual needs. On the other hand, the top of the partition 11 may not be provided with a raised fence, and by designing an adhesive layer to fill the gap between the adjacent display screens 4 on the top of the partition 11, to realize the mutual support and abutment between the display screens 4 and realize the position limit, which is not specifically limited in the present application.

Further, referring to FIG. 4 and FIG. 5, in the embodiment of the present application, the partition 11 is provided with a functional groove 111, and a notch of the functional groove 111 is provided at a side away from the backboard 3. The display screen 4 is arranged on the top of the partition 11, and one end of the wiring of the display screen 4 is arranged corresponding to the functional groove 111. It is appreciated that the wiring end of the display screen 4 is one end that needs to be connected to a structure such as a control chip, a control panel, or a chip-on-film. In an embodiment of the present application, the partition 11 is cross-shaped and is installed with the middle frame 10 and the backboard 3 to form four installation areas 12, and four groups of the backlight modules is provided, which are respectively installed in inner spaces of the installation areas 12, the four display screen 4 are respectively disposed on the installation areas 12 and on the top of the partition 11 and the top of the middle frame 10, wherein the wiring end on the display screen 4 is provided with the chip-on-film. In the embodiment of the present application, a functional groove 111 is provided on a vertically arranged partition strip 110 in the partition 11, and two installation areas 12 are respectively provided on the left and right sides of the vertically arranged partition strip 110, which are the upper left installation area, the lower left installation area, the upper right installation area, and the lower right installation area, respectively. The middle frame is also provided with an accommodation structure corresponding to the wiring of the display screen 4. In the embodiment of the present application, the chip-on-film of the display screen 4 installed in the upper left installation area is arranged on opposite sides facing the middle frame 10; the chip-on-film of the display screen 4 installed in the upper left installation area is installed in the accommodation structure provided on the middle frame 10; the chip-on-film of the display screen 4 installed in the lower left installation area is set on the side facing the vertically arranged partition strip 110 and the side away from the upper left installation area; the chip-on-film of the display screen 4 set on the side facing the vertically arranged partition strip 110 is installed in the functional groove 111, and the chip-on-film of the display screen 4 installed in the lower left installation area set on the side away from the upper left installation area is installed in the accommodation structure provided on the middle frame 10. The chip-on-film of the display screen 4 installed in the lower right installation area is arranged on both sides facing the middle frame 10; the chip-on-film of the display screen 4 installed in the lower right installation area is installed in the accommodation structure provided on the middle frame 10; the chip-on-film of the display screen 4 installed in the upper right installation area is located on the side facing the vertically arranged partition strip 110 and the side away from the upper left installation area, and the chip-on-film of the display screen 4 installed in the right upper installation areas set on the side facing the vertically arranged partition strip 110 is installed in the functional groove 111, and the chip-on-film of the display screen 4 installed in the right upper installation areas set on the side away from the vertically arranged partition strip 110 is installed in the accommodation structure provided on the middle frame 10.

The splicing installation assembly and the display device of a display device provided by the embodiments of the present application have been described in detail above. Specific examples are used in this document to explain the principles and implementation of the present invention. The descriptions of the above embodiments are only for understanding the method of the present invention and its core idea; Meanwhile, for those skilled in the art, according to the idea of the present invention, there will be changes in the specific implementation and application scope. In summary, the content of this specification should not be construed as a limitation on the present invention.

What is claimed is:

1. A display device, comprising a splicing installation assembly and a plurality of backlight modules, wherein the backlight modules comprise optical films; the splicing installation assembly comprises a single integral backboard, a middle frame, and a partition; the middle frame is installed on the backboard, the middle frame and the backboard cooperatively define an accommodation space; and the partition is disposed in the middle frame and connected to an inner wall of the middle frame and is configured to partition the accommodation space to form a plurality of installation areas; the plurality of backlight modules are respectively installed in the plurality of installation areas;
   wherein a position of the backboard corresponding to the partition is provided with a limit groove, a first limit structure is disposed in the limit groove, and a second limit structure is disposed at one end of the partition installed in the limit groove,
   a side of the backboard facing the installation areas is correspondingly provided with a plurality of protruding structures, the protruding structures are configured to support the optical films, each of the protruding structures is a conical protrusion, and a small end of each said protruding structures faces the optical films,
   a width of the partition is less than twice a width of the middle frame, and
   the partition comprises a plurality of partition strips, wherein each partition strip is configured to be spliced with one or more other partition strips of the plurality of partition strips and the middle frame to form the plurality of installation area, and a gap is provided between at least two of the plurality of partition strips that are spliced with each other;
   wherein the display device further comprises a number of the backlight modules corresponding to a number of the installation areas, and the plurality of the backlight modules are respectively installed in the plurality of installation areas in a one-to-one correspondence;
   wherein the display device further comprises a number of display screens corresponding to the number of the installation areas, and the plurality of the display screens are installed in the installation areas in a one-to-one correspondence and are disposed above the backlight module;
   wherein the display screens are installed on a top of the middle frame and a top of the partition, the top of the middle frame is provided with a raised fence as an independent component from the middle frame, the raised fence is disposed around the display screens, the partition is provided with a functional groove, and a wiring end of the display screens is disposed corresponding to the functional groove.

2. The display device according to claim 1, wherein a top of the partition and a top of the middle frame are respectively configured for installing a limit adhesive layer on the display screens.

3. The display device according to claim 1, wherein the splicing installation assembly further comprises: a first installation portion and a second installation portion;
   the first installation portion is arranged at the middle frame, and the second installation portion is arranged at the partition; and
   the first installation portion and the second installation portion are respectively disposed facing the installation areas, and are configured to install the optical films.

4. The display device according to claim 3, wherein
   the first installation portion is a first installation platform, and the first installation platform is arranged on the inner wall of the middle frame facing the partition;
   the second installation part is a second installation platform, and the second installation platform is disposed on a side wall of the partition facing the middle frame; and
   the first installation platform and the second installation platform are disposed on a same horizontal plane.

5. The display device according to claim 1, wherein a reflective layer is disposed on the side wall of the partition facing the middle frame.

6. The display device according to claim 1, wherein the partition is cross-shaped, and the partition is configured to divide the middle frame to form four installation areas, and
   the plurality of partition strips of the partition comprise a first partition strip, a second partition strip, and a third partition strip, wherein two ends of the first partition strip, one end of the second partition strip, and one end of the third partition strip are respectively connected to the inner wall of the middle frame, and the gap is provided between the first partition strip and each of the other end of the second partition strip and the other end of the third partition strip, so as to provide expansion space.

7. The display device according to claim 1, wherein a backboard installation groove is disposed on the inner wall of the middle frame facing the partition, and an edge of the backboard is disposed in the backboard installation groove.

8. The display device according to claim 1, wherein the partition is provided with a functional groove for wiring and installing a control structure.

9. The display device according to claim 1, wherein the partition is detachably connected to the backboard through a locking structure.

10. The display device according to claim 1, wherein each of the protruding structures is a conical protrusion.

\* \* \* \* \*